July 27, 1948.  F. TREVINO  2,445,842
LAWN EDGE TRIMMER
Filed Sept. 27, 1946  2 Sheets-Sheet 1
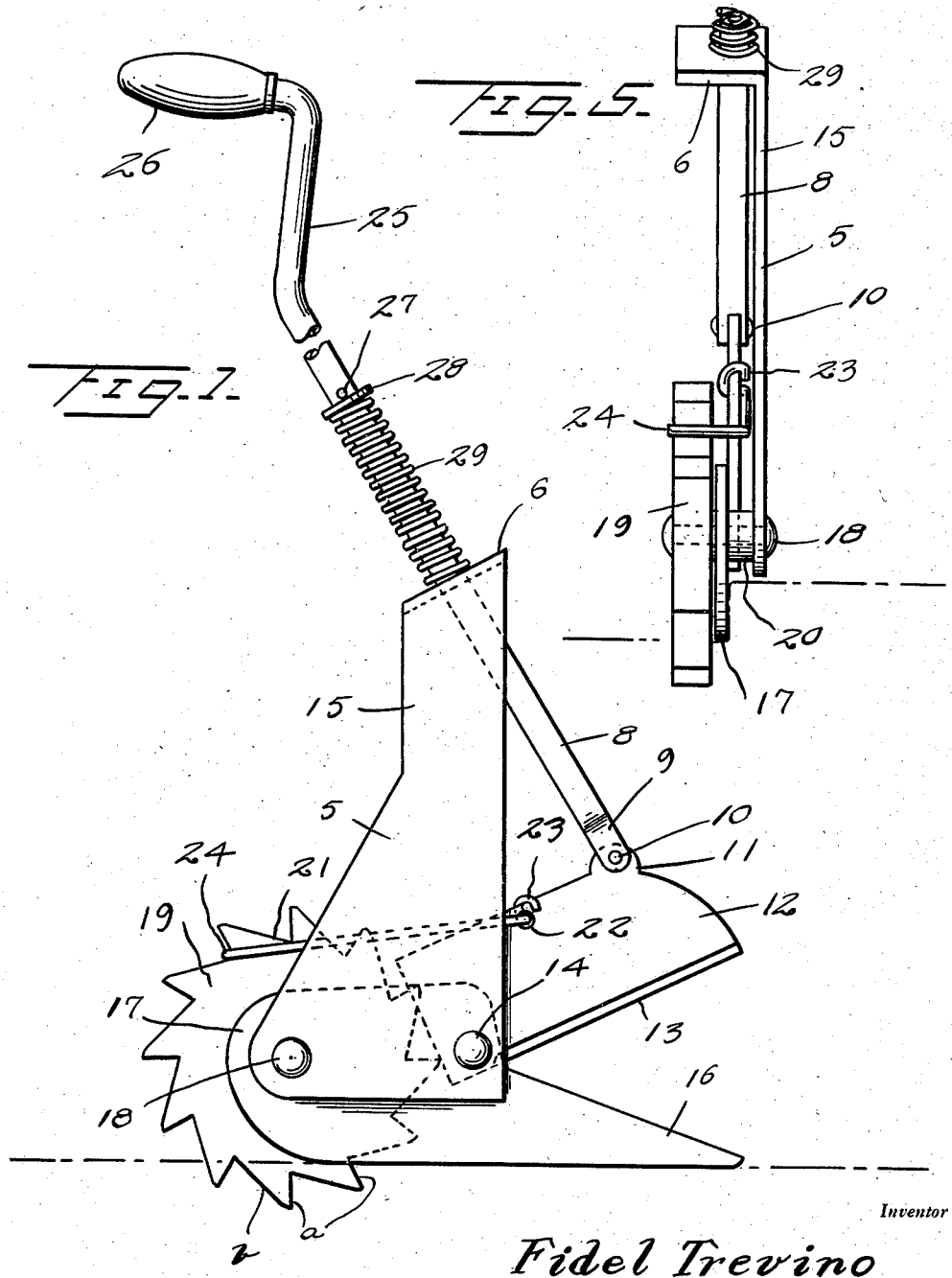
Inventor
*Fidel Trevino*
By *Randolph & Beavers*
Attorneys

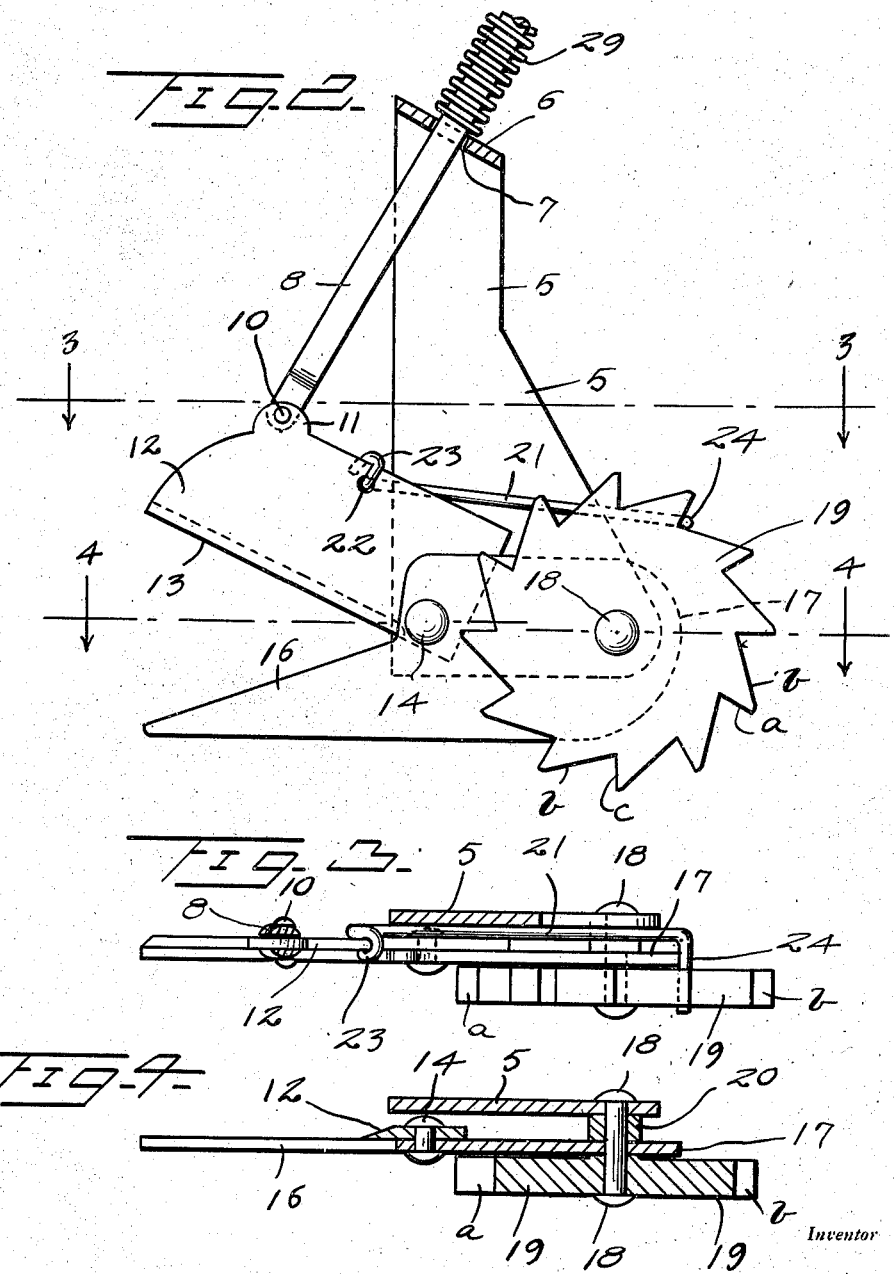

Patented July 27, 1948

2,445,842

UNITED STATES PATENT OFFICE 2,445,842

LAWN EDGE TRIMMER

Fidel Trevino, Los Angeles, Calif.

Application September 27, 1946, Serial No. 699,727

6 Claims. (Cl. 56—241)

This invention appertains to new and useful improvements in cutting devices and more particularly to a handy device for trimming lawn edges, as for instance along walkways, flower beds, etc.

The principal object of the present invention is to provide a device which can be wheeled along the lawn and intermittently actuated for clipping grass at walk edges and along flower beds and other places where it is inconvenient to move a lawn mower.

Another important object of the invention is to provide a lawn edge trimmer including a wheel which is actuated incident to the operation of the shears to feed the device along.

Still another object of the invention is to provide a lawn edge trimmer including a traction wheel and a shear structure, wherein both the traction wheel and the shear structure are operated coordinately and incident to single impulses transmitted by slight effort.

A further object of the invention is to provide lawn edge trimming shears capable of operation more efficiently than anything along this line heretofore marketed, and which can be manufactured and retailed at a low price.

These and various other objects and advantages of the invention will become apparent to the reader of the following description.

In the drawings—

Figure 1 is a side elevational view of the implement;

Figure 2 is a side elevational view of the implement, looking at the opposite side from that shown in Figure 1, and with the upper portion of the device removed;

Figure 3 is a section taken on line 3—3 of Figure 2;

Figure 4 is a section taken on line 4—4 of Figure 2;

Figure 5 is a rear elevational view of the device as shown in Figure 2.

Referring to the drawings, numeral 5 denotes a vertical plate having an inclined laterally disposed flange 6 formed with an opening 7, through which an inclined rod or hand bar 8 is slidable, the lower end of this hand bar being flattened as at 9 and pivotally secured as at 10 to an ear 11 on the upper curved edge portion of a pivotal blade 12, the lower edge of which is beveled to a cutting edge 13. The inner lower corner of the blade 12 is pivotally secured to the lower forward corner of the plate 5, as at 14, the lower portion of the plate 5 being substantially broader than the upper portion 15.

A complemental stationary blade 16 has a horizontally enlarged portion 17 which substantially depends below the lower broad portion of the plate 5, this portion of the stationary blade 16 being secured to the lower portion of the plate 5 by the pivot member 14 and a pin 18, the latter extending not only through the plate 5 and the portion 17 of the stationary blade 16, but also through a ratchet toothed traction wheel 19, there being a spacer 20 on the pivot pin 18, between the plate 5 and the portion 17 of the stationary blade 16. The traction wheel 19 has teeth, each of which has an edge $a$, radially disposed, while the remaining edge slopes as denoted by reference character $b$.

A spring wire arm 21, has one end disposed through an opening 22 in the upper medial portion of the swingable blade 12, this end being bent over the upper edge of the blade 12 as at 23. The remaining end of the wire arm 21 has a lateral foot 24 for engagement against the crotch portions of the teeth of the wheel 19 for bodily rotating the wheel when the pivoted blade 12 is actuated.

The hand bar 8 extends through the opening 7 of the flange 6 and well above the plate 5, the same having an oblique vertical portion 25 adjacent its upper end and from the upper end projects a handle 26, in a rearward direction.

Under the oblique portion 25, the rod 8 has a cross pin 27 against which abuts a collar 28, and convoluted on the hand bar 8 and interposed between the collar 28 and the flange 6 is a coiled compression spring 29.

In the operation and use of this implement, the lower portion is placed along the edge of a walkway, as suggested in Figure 5, and by pressing downwardly on the handle 26, the hand bar 8 will be urged downwardly, through the opening 7, compressing the spring 29 and swinging the blade 12 downwardly to cooperate with the stationary blade 16 in cutting grass interposed between the cutting edges. Simultaneous with this operation of the blade 12, the foot portion 24, being located behind one of the teeth of the traction wheel 19, will pull on that tooth and cause a partial rotation of the wheel 19, this action serving to feed the implement forwardly during the cutting operation, so as to increase the volume of grass being cut, while at the same time advancing the implement to a new position.

The various parts are held in positive cooperating relation by a simplified construction and relationship of elements.

Very little effort is required in depressing the hand bar 8 to actuate, simultaneously the blade 12 and the traction wheel 19.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

1. A lawn trimming device comprising a vertical member, a stationary blade projecting from the vertical member, a pivotal blade carried by the vertical member and being cooperative with the stationary blade, a traction wheel provided with peripheral teeth and being carried by the vertical member, means for depressing the pivotal blade in cutting grass in cooperation with the stationary blade and a member projecting from the pivotal blade and cooperative with the toothed wheel for advancing the wheel during each pivotal movement of the pivotal blade.

2. A lawn trimming device comprising a vertical member, a stationary blade projecting from the vertical member, a pivotal blade carried by the vertical member and being cooperative with the stationary blade, a traction wheel provided with peripheral teeth and being carried by the vertical member, means for depressing the pivotal blade in cutting grass in cooperation with the stationary blade and a member projecting from the pivotal blade and cooperative with the toothed wheel for advancing the wheel during each pivotal movement of the pivotal blade, said means for depressing the pivotal blade consisting of an elongated slide bar having its lower end pivotally connected to the last mentioned blade and provided with a handle at its upper end.

3. A lawn trimming device comprising a vertical member, a stationary blade projecting from the vertical member, a pivotal blade carried by the vertical member and being cooperative with the stationary blade, a traction wheel provided with peripheral teeth and being carried by the vertical member, means for depressing the pivotal blade in cutting grass in cooperation with the stationary blade and a member projecting from the pivotal blade and cooperative with the toothed wheel for advancing the wheel during each pivotal movement of the pivotal blade, said means for depressing the pivotal blade consisting of an elongated slide bar having its lower end pivotally connected to the last mentioned blade and provided with a handle at its upper end, said vertical member being provided with a flange having an opening through which the bar is slidable.

4. A lawn trimming device comprising a vertical member, a stationary blade projecting from the vertical member, a pivotal blade carried by the vertical member and being cooperative with the stationary blade, a traction wheel provided with peripheral teeth and being carried by the vertical member, means for depressing the pivotal blade in cutting grass in cooperation with the stationary blade and a member projecting from the pivotal blade and cooperative with the toothed wheel for advancing the wheel during each pivotal movement of the pivotal blade, said means for depressing the pivotal blade consisting of an elongated slide bar having its lower end pivotally connected to the last mentioned blade and provided with a handle at its upper end, said vertical member being provided with a flange having an opening through which the bar is slidable, and spring means for returning the hand bar to an elevated position with the pivoted blade away from the stationary blade.

5. A lawn trimming device comprising a vertical member, a stationary blade projecting from the vertical member, a pivotal blade carried by the vertical member and being cooperative with the stationary blade, a traction wheel provided with peripheral teeth and being carried by the vertical member, means for depressing the pivotal blade in cutting grass in cooperation with the stationary blade and a member projecting from the pivotal blade and cooperative with the toothed wheel for advancing the wheel during each pivotal movement of the pivotal blade, said member projecting from the pivoted blade to the traction wheel consisting of an arm of spring material having a foot at its free end engaged successively with the teeth of said traction wheel.

6. A lawn trimming device comprising a vertical member, a stationary blade projecting from the vertical member, a pivotal blade carried by the vertical member and being cooperative with the stationary blade, a traction wheel provided with peripheral teeth and being carried by the vertical member, means for depressing the pivotal blade in cutting grass in cooperation with the stationary blade and a member projecting from the pivotal blade and cooperative with the toothed wheel for advancing the wheel during each pivotal movement of the pivotal blade, said means for mounting the pivotal blade and traction wheel on the vertical structure serving to secure said stationary blade to said vertical structure.

FIDEL TREVINO.